United States Patent
Cochran et al.

(10) Patent No.: US 9,903,658 B2
(45) Date of Patent: Feb. 27, 2018

(54) INSERT FOR HEAT EXCHANGER AND HEAT EXCHANGER HAVING THE SAME

(71) Applicants: DENSO International America, Inc., Southfield, MI (US); DENSO CORPORATION, Kariya, Aichi-pref. (JP)

(72) Inventors: William Cochran, Troy, MI (US); James Stander, West Bloomfield, MI (US); Kosuke Hayashi, Kariya (JP)

(73) Assignees: DENSO International America, Inc., Southfield, MI (US); DENSO CORPORATION, Southfield, MI (US)

( * ) Notice: Subject to any disclaimer, the term of this patent is extended or adjusted under 35 U.S.C. 154(b) by 628 days.

(21) Appl. No.: 14/492,157

(22) Filed: Sep. 22, 2014

(65) Prior Publication Data
US 2015/0247677 A1  Sep. 3, 2015

Related U.S. Application Data

(63) Continuation-in-part of application No. 14/193,057, filed on Feb. 28, 2014.

(51) Int. Cl.
| | |
|---|---|
| F28D 1/04 | (2006.01) |
| F28D 1/053 | (2006.01) |
| F28F 1/20 | (2006.01) |
| F28F 1/22 | (2006.01) |
| F28F 9/22 | (2006.01) |
| B60H 1/00 | (2006.01) |
| F28D 21/00 | (2006.01) |

(52) U.S. Cl.
CPC ..... *F28D 1/05316* (2013.01); *F28D 1/05366* (2013.01); *F28F 1/20* (2013.01); *F28F 1/22* (2013.01); *F28F 9/22* (2013.01); *B60H 2001/00135* (2013.01); *F28D 2021/0085* (2013.01); *F28F 2009/226* (2013.01); *F28F 2275/08* (2013.01)

(58) Field of Classification Search
CPC .......... F28F 9/013; F28F 9/0132; F28F 9/005; F28F 1/24
USPC .................................... 165/96, 151
See application file for complete search history.

(56) References Cited

U.S. PATENT DOCUMENTS

| | | | | |
|---|---|---|---|---|
| 3,055,398 | A | * 9/1962 | Tunnessen | F28F 9/0132 138/111 |
| 3,929,569 | A | * 12/1975 | Piepers | F16F 1/18 165/69 |
| 4,570,703 | A | * 2/1986 | Ringsmuth | F28F 9/0132 165/162 |

(Continued)

FOREIGN PATENT DOCUMENTS

| | | |
|---|---|---|
| JP | H10278547 A | 10/1998 |
| JP | 2006-170955 A | 6/2006 |
| JP | 2011-016524 A | 1/2011 |

OTHER PUBLICATIONS

International Search Report and Written Opinion issued Dec. 7, 2015 in corresponding PCT Application No. PCT/JP2015/000847.

*Primary Examiner* — Claire Rojohn, III

(57) ABSTRACT

An insert is configured to be inserted into a heat exchanger having a plurality of tubes. The insert includes a base and a multiple blades. The blades are extended from the base. At least one of the blades has a spring portion. The spring portion is resiliently deformable and configured to be resiliently inserted between two of the tubes.

14 Claims, 12 Drawing Sheets

(56) References Cited

U.S. PATENT DOCUMENTS

| | | | | |
|---|---|---|---|---|
| 4,860,697 | A | * | 8/1989 | Malaval ............... C09B 47/0675 122/510 |
| 5,072,786 | A | * | 12/1991 | Wachter ................ F28F 9/0132 165/162 |
| 6,308,770 | B1 | * | 10/2001 | Shikata .............. B60H 1/00064 165/126 |
| 7,506,684 | B2 | * | 3/2009 | Wanni .................... F28F 9/0132 165/162 |
| 8,720,529 | B2 | * | 5/2014 | Suzuki ............... B60H 1/00328 165/42 |
| 9,488,419 | B2 | * | 11/2016 | Wanni ..................... F28F 9/013 |
| 2006/0108106 | A1 | * | 5/2006 | Rudy .................... F28F 9/0132 165/162 |
| 2007/0089856 | A1 | * | 4/2007 | Wanni .................... F22B 37/205 165/69 |
| 2009/0277606 | A1 | * | 11/2009 | Reiss, III ............. F28D 7/1692 165/69 |
| 2011/0005730 | A1 | * | 1/2011 | Habasita ............ B60H 1/00028 165/121 |
| 2015/0247685 | A1 | * | 9/2015 | Cochran ................ F28F 9/005 165/76 |
| 2017/0059230 | A1 | * | 3/2017 | Mazzocco ............... F25D 21/14 |

\* cited by examiner

INSERT FOR HEAT EXCHANGER AND HEAT EXCHANGER HAVING THE SAME

CROSS-REFERENCE TO RELATED APPLICATION

The application claims the benefit of U.S. application Ser. No. 14/193,057, filed on Feb. 28, 2014. The entire disclosures of the above application are incorporated herein by reference.

TECHNICAL FIELD

The present disclosure relates to an insert for a heat exchanger. The present disclosure relates to the heat exchanger having the insert.

BACKGROUND

A vehicle is generally equipped with an air conditioner having a refrigerant cycle. The refrigerant cycle generally includes an evaporator for cooling air drawn into a cabin of the vehicle. It may be desirable to provide individually conditioned air to a front compartment and a rear compartment in the vehicle at different conditions such as different temperatures.

SUMMARY

According to an aspect of the disclosure, an insert is for a heat exchanger having a plurality of tubes. The insert comprises a base. The insert further comprises a plurality of blades extended from the base. At least one of the blades has a spring portion, which is resiliently deformable and configured to be resiliently inserted between two of the tubes.

According to another aspect of the disclosure, an insert is for a heat exchanger having a plurality of tubes. The insert comprises a base. The insert further comprises a plurality of blades extended from the base. At least one of the blades has a spring portion including two arms. The two arms are projected outward to form an aperture therebetween. The spring portion is resiliently deformable inward to squish the aperture when the spring portion is inserted between two of the tubes.

According to another aspect of the disclosure, a heat exchanger comprises a plurality of tubes arranged in parallel to form a core including a first section and a second section. The heat exchanger further comprises a first insert inserted between the first section and the second section from one direction to partition the first section from the second section. The first insert is integrally formed in a comb shape to include a first base and a plurality of first blades. The first blades are extended from the first base. At least one of the first blades has a first spring portion, which is resiliently deformable and resiliently inserted between two of the tubes.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION (First Embodiment)

As follows, a first embodiment of the present disclosure will be described with reference to drawings. In the description, a vertical direction is along an arrow represented by "VERTICAL" in drawing(s). A lateral direction is along an arrow represented by "LATERAL" in drawing(s). A depth direction is along an arrow represented by "DEPTH" in drawing(s). A thickness direction is along an arrow represented by "THICKNESS" in drawing(s). A length direction is along an arrow represented by "LENGTH" in drawing(s). A width direction is along an arrow represented by "WIDTH" in drawing(s).

Figure 1:
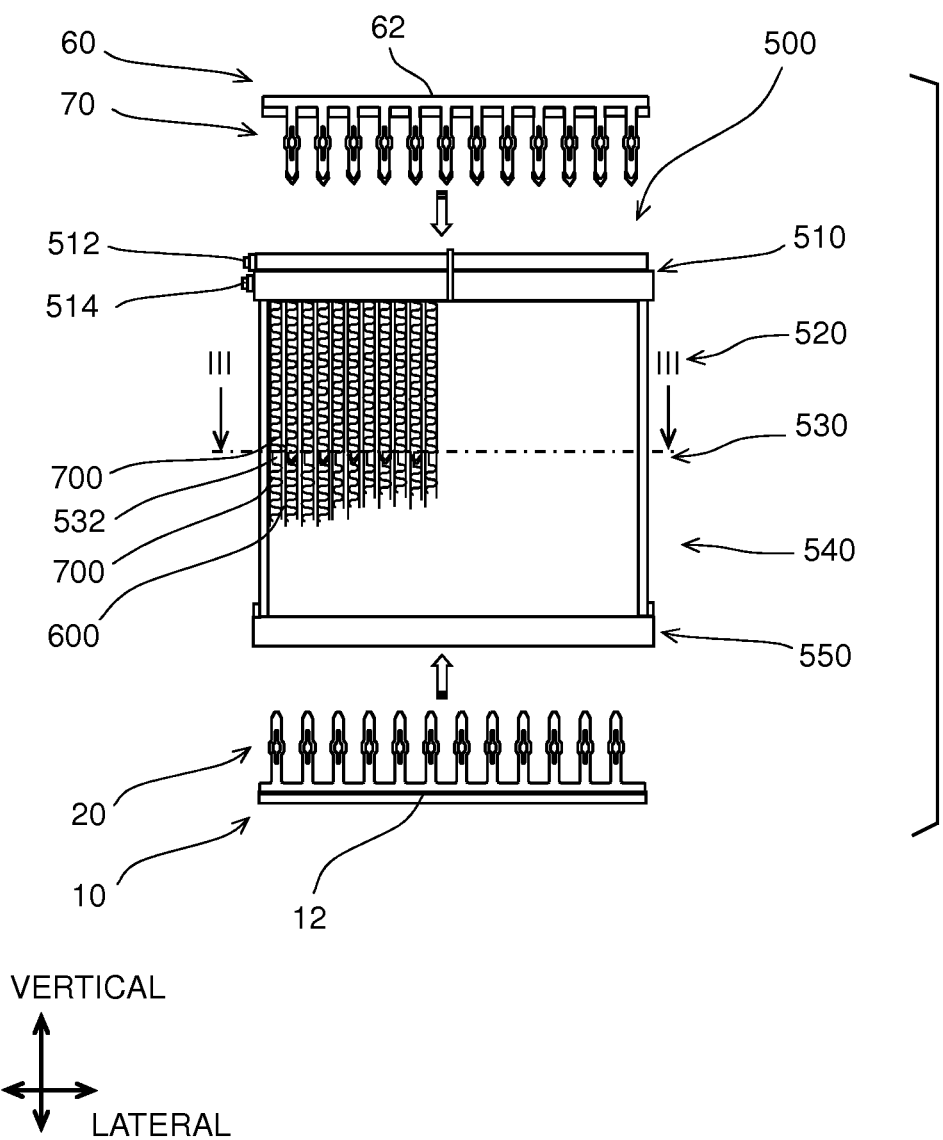
FIG. 1 is a perspective view showing an evaporator and inserts.

As shown in FIG. 1, an evaporator 500 (heat exchanger) includes an upper tank 510, a lower tank 550, multiple tubes 600, and multiple fins 700. The upper tank 510, the lower tank 550, the tubes 600, and the fins 700 are integrated with each other and brazed into one component. The evaporator 500 functions as a component of a refrigerant cycle to circulate a thermal medium, such as $CO_2$, therethrough. The refrigerant cycle includes, for example, the evaporator 500, a thermal expansion valve, a compressor, and a condenser (none shown), which are connected with each other via unillustrated pipes. The upper tank 510 includes an inlet 512 and an outlet 514. The inlet 512 is connected with the thermal expansion valve via a pipe. The outlet 514 is connected with the compressor via a pipe.

The tubes 600 and the fins 700 are stacked alternately in the lateral direction to form a core. The alternately stacked tubes 600 and fins 700 are interposed between the upper tank 510 and the lower tank 550 at both ends. One ends of the tubes 600 on the upper side are inserted into the upper tank 510 and communicated with a fluid space formed in the upper tank 510. The other ends of the tubes 600 are inserted into the lower tank 550 and communicated with a fluid space formed in the lower tank 550. Thus, the upper tank 510, the tubes 600, and the lower tank 550 form a fluid passage to flow the thermal medium therethrough.

Each of the fins 700 is extended in the vertical direction and is interposed between adjacent tubes 600 in the lateral direction. The fin 700 and the adjacent tubes 600 form air passages to flow air therethrough. The fins 700 enhance a performance of heat exchange between the thermal medium, which flows through the tubes 600, with air, which passes through the air passages.

The core includes a first section 520, an intermediate section 530, and a second section 540. The intermediate section 530 is located between the first section 520 and the second section 540. The intermediate section 530 is located around the chain line III-III in FIG. 1. Each fin 700 of the first section 520 extends downward from its upper end to the intermediate section 530. Each fin 700 of the second section 540 extends from its lower end upward to the intermediate section 530. Thus, each fin 700 of the first section 520 and the corresponding fin 700 of the second section 540 form a clearance 532 therebetween in the vertical direction. The fins 700 of the first section 520 stacked in the lateral direction and the fins 700 of the second section 540 stacked in the lateral direction form the clearances 532, which are linearly arranged in the lateral direction.

The evaporator 500 is configured to be equipped with a fore insert (first insert) 10 and a rear insert (second insert) 60 to partition the evaporator 500 into the first section 520 and the second section 540. In FIG. 1, the inserts 10 and 60 are to be inserted into the clearances 532 between the first section 520 and the second section 540 along the bold arrows. The fore insert 10 includes multiple blades (first blades) 20 extended from a base 12. The blades 20 are configured to be inserted into the clearances 532, respectively. The rear insert 60 also includes multiple blades (second blades) 70 extended from a base 62. The blades 70 are configured to be inserted into the clearances 532, respectively. The fore insert 10 may be identical to the rear insert 60.

Figure 2:
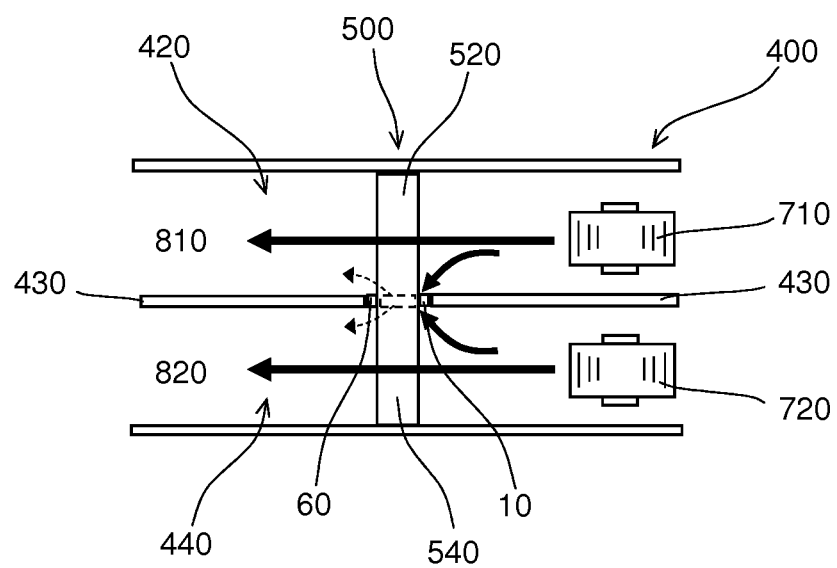
FIG. 2 is a schematic view showing the evaporator in an HVAC case.
Figure 2:
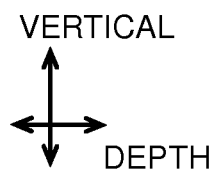

FIG. 2 shows a heater and ventilator air conditioner (HVAC) system. In FIG. 2, the evaporator 500 is equipped in a case 400 of the HVAC system. The case 400 has partitions 430 to partition an interior of the case 400 into an upper passage 420 and a lower passage 440. The inserts 10 and 60 are inserted in the evaporator 500 and are connected with the partitions 430, respectively.

The bold arrows show airflows in the upper passage 420 and the lower passage 440, respectively. The inserts 10 and 60 enables the upper passage 420 on the upstream side of the first section 520 to communicate with the upper passage 420 on the downstream side of the first section 520 through the first section 520. The inserts 10 and 60 further enables the lower passage 440 on the upstream side of the second section 540 to communicate with the lower passage 440 on the downstream side of the second section 540 through second section 540.

A heater core and doors (none shown) are provided at the downstream of the first section 520 and the second section 540 of the evaporator 500 to heat air after passing through the evaporator 500 and to conduct the air into the front compartment 810 and the rear compartment 820 separately in the vehicle. In the present example, the upper passage 420 and the lower passage 440 are provided with a front fan 710 and a rear fan 720, respectively, to cause airflows separately.

The front fan 710 and the rear fan 720 flow air through the upper passage 420 and the lower passage 440, respectively, and through the first section 520 and the second section 540 of the evaporator 500, respectively. Thus, the air flowing through the first section 520 and the air flowing through the second section 540 are conditioned, i.e., cooled separately. Thus, the conditioned air is conducted toward the front compartment 810 and the rear compartment 820 separately. In the present configuration, the inserts 10 and 60 function to restrict air from crosstalk (leakage) between the upper passage 420 and the lower passage 440. As shown by dotted arrow in FIG. 2, the airflows may cause a small crosstalk by an allowable quantity.

Figure 3:
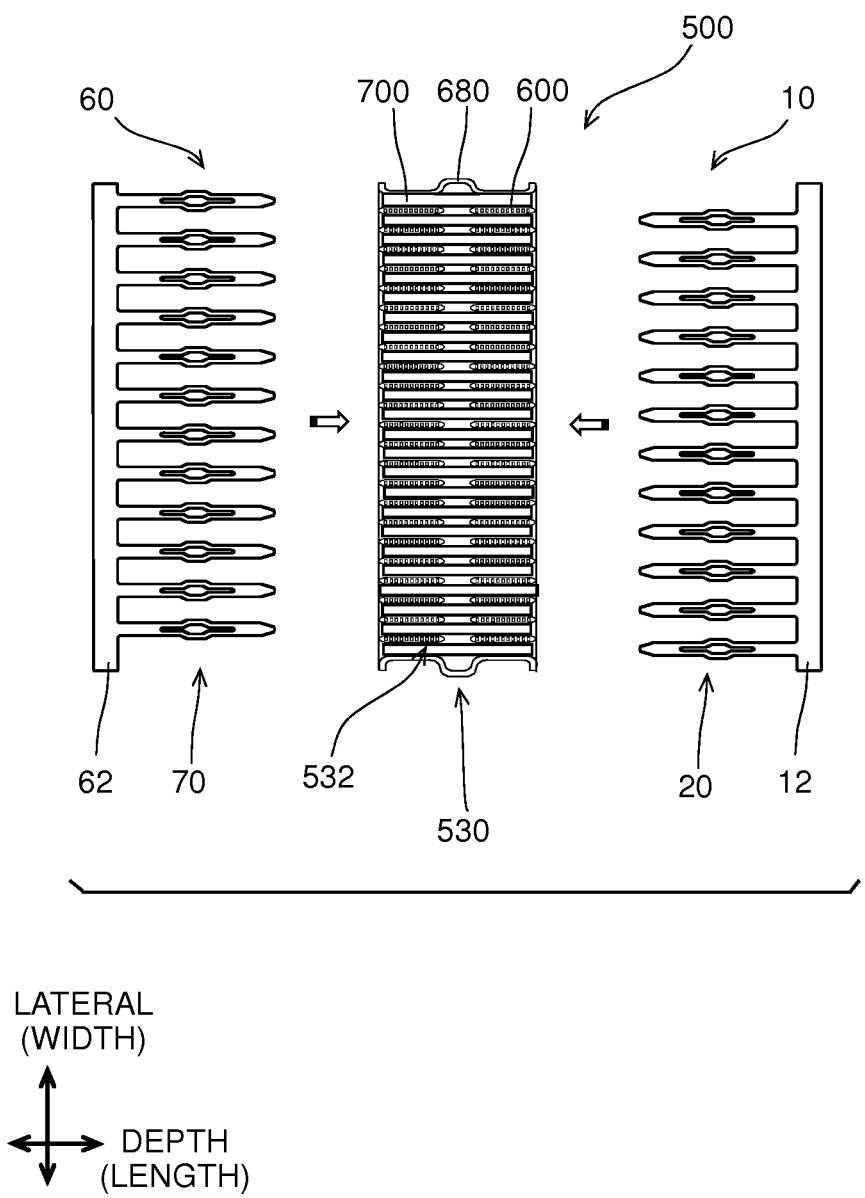
FIG. 3 is a sectional view showing the evaporator and inserts to be inserted in the evaporator.
Figure 4:
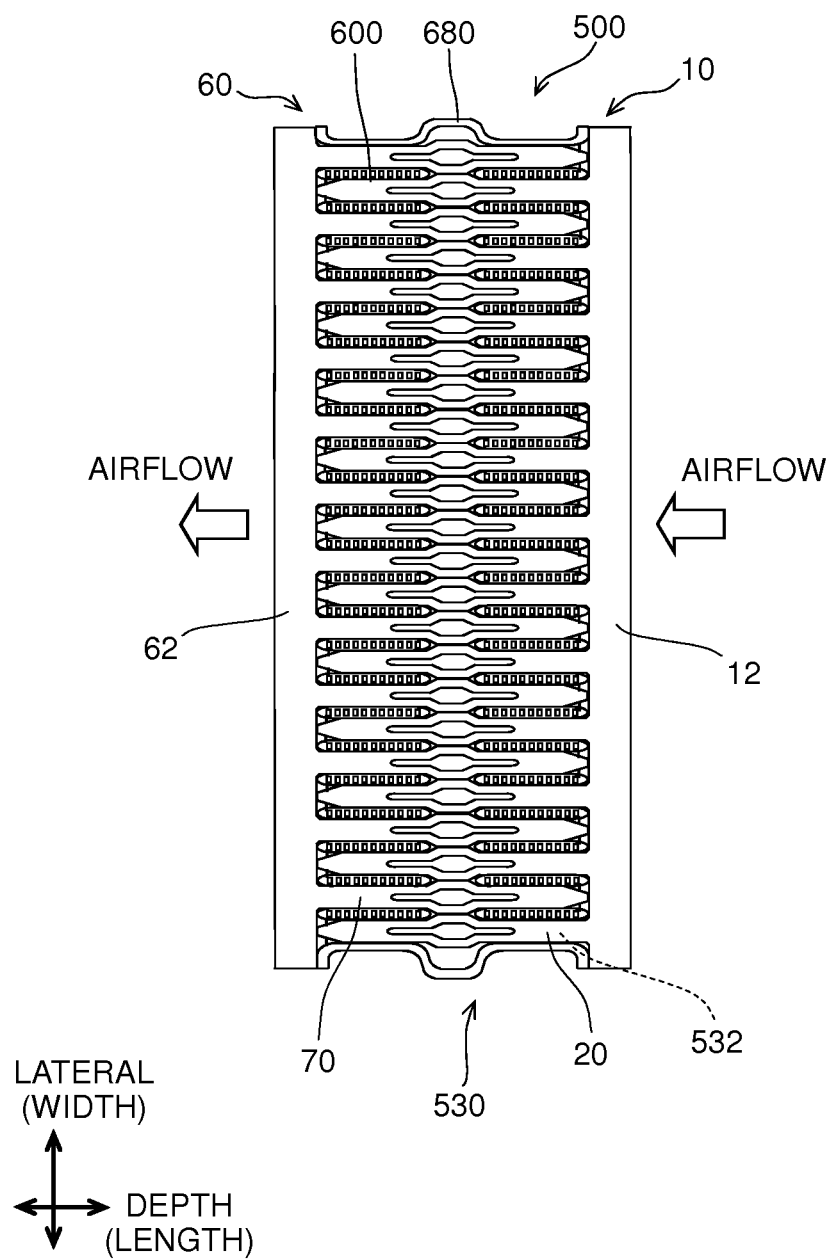
FIG. 4 is a sectional view showing the evaporator and inserts inserted in the evaporator.

FIG. 3 is a sectional view showing the intermediate section 530 of the evaporator 500 taken along the line III-III in FIG. 1. FIG. 3 shows the intermediate section 530 before being equipped with the inserts 10 and 60 in the clearances 532. FIG. 4 is a sectional views showing the intermediate section 530 of the evaporator 500 being equipped with the inserts 10 and 60 in the clearances 532. In FIGS. 3, 4 and in FIGS. 6 to 8 and 10 mentioned later, hatching for showing cross sections of the tubes 600 and reinforcement 680 are omitted.

As shown in FIG. 3, the fore insert 10 is to be inserted from one side in the depth direction, and the rear insert 60 is to be inserted from the other side in the depth direction. The depth direction is substantially in parallel with a direction of the airflow described with reference to FIG. 2. The evaporator 500 includes two rows of the tubes 600 arranged, with respect to the airflow, on the upstream side and on the downstream side, respectively. Each row includes tubes 600, which are arranged in parallel along the lateral direction. The tubes 600 interpose the fins 700 alternately therebetween. Each fin 700 extends in the depth direction between the two rows to bridge the tubes 600 in the two rows. The evaporator 500 is equipped with reinforcements 680 at ends, respectively.

As shown in FIG. 4, the fore insert 10 is inserted into the evaporator 500 from the upstream side of airflow, and the rear insert 60 is inserted into the evaporator 500 from the downstream side of airflow. In the state of FIG. 4, each blade 20 is inserted into the corresponding clearance 532. Thus, each blade 20 is interposed between adjacent two tubes 600 or interposed between the tube 600 and the reinforcement 680, which are adjacent to each other. In the state of FIG. 4, the comb-shaped fore insert 10 and the comb-shaped rear insert 60 are opposed to each other in the depth direction. The blades 20 of the fore insert 10 and the blades 70 of the rear insert 60 are arranged alternately and located substantially at the same level in the vertical direction (FIG. 1). In the present example, the blades 20 of the two inserts 10 and the blades 70 of the rear insert 60 do not overlap one another and positioned within a thin space in the vertical direction.

As follows, detailed configurations of the insert 10 will be described. The configurations of the rear insert 60 may be substantially the same as the configurations of the fore insert 10. Therefore, following detailed description of the fore insert 10 may be applied to the rear insert 60.

The insert 10 is substantially in a comb shape and integrally formed of a resin material such as ABS resin by, for example, injection molding or stamping. The insert 10 includes the blades 20 and the base 12. The base 12 is substantially in a bar shape. The blades 20 are extended from the base 12 in the same direction perpendicularly to a longitudinal direction of the base 12. The blades 20 are arranged in parallel along the width direction.

Figure 5:
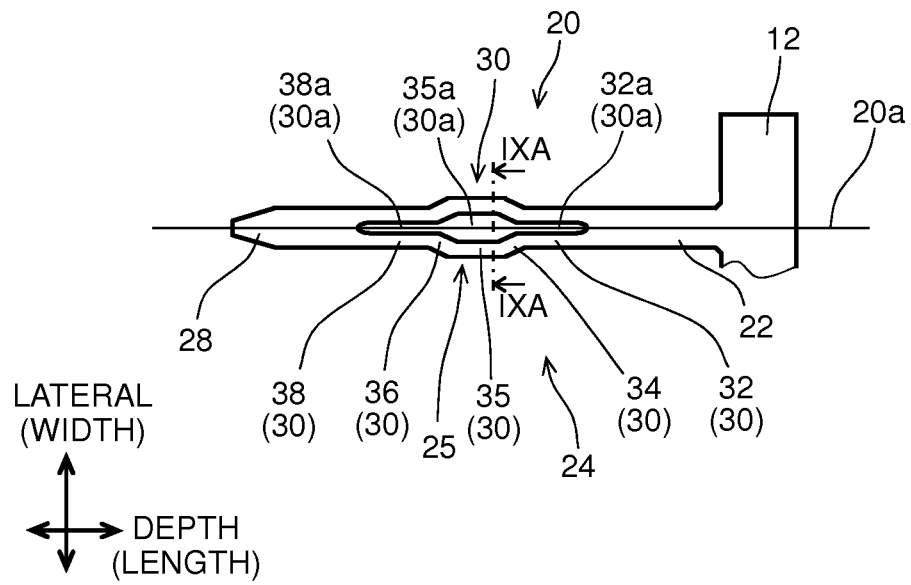
FIG. 5 is a top view showing a blade of one insert.

As shown in FIG. 5, each blade 20 and the base 12 are integrally formed to form a cantilever structure. The blade 20 includes a root end 22, two arms 30, and a tip end 28, which are arranged in this order from the base 12. The root end 22 extends from the base 12. The arms 30 are extended from the base 12. The tip end 28 is extended from the arms 30 to form a free end of the cantilever structure. The tip end 28 is chamfered at its free end.

The two arms 30 are arranged in parallel. The two arms 30 form an aperture 30$a$ therebetween. The aperture 30$a$ is a single hollow space including a first slit 32$a$, a center hole 35$a$, and a second slit 38$a$ in this order. The dimension of the first slit 32$a$, the center hole 35$a$, and the second slit 38$a$ are determined in consideration of a resilience of the two arms 30, a mechanical strength of the two arms 30, and an allowable communication (crosstalk) of air between the upper passage 420 and the lower passage 440 (FIG. 2) through the aperture 30$a$.

The arms 30 are symmetrical with respect to an axis 20$a$ of the blade 20. Each arm 30 includes a first linear portion 32, a first bent portion 34, a center portion 35, a second bent portion 36, and a second linear portion 38, which are arranged in this order. The first bent portion 34, the center portion 35, and the second bent portion 36 form a C-shaped portion 25 projected outward from the axis 20$a$ in the width direction relative to the first linear portion 32 and the second linear portion 38.

The first linear portion 32 is extended linearly from the root end 22 along the axis 20$a$. The first bent portion 34 is extended from the first linear portion 32 and inclined outward from the axis 20$a$. The first bent portion 34 is inclined relative to the first linear portion 32 and the center portion 35. The center portion 35 is extended linearly along the axis 20$a$ and is located outward relative to the first linear portion 32 and the second linear portion 38. The center portion 35 is connected with the first linear portion 32 via the first bent portion 34. The center portion 35 is further connected with the second linear portion 38 via the second bent portion 36. The second bent portion 36 is extended from the center portion 35 and is inclined inward toward the axis 20$a$. The second bent portion 36 is inclined relative to the center portion 35 and the second linear portion 38. The second linear portion 38 extends linearly from the second bent portion 36 to the tip end 28. The root end 22, the first linear portion 32, the center portion 35, the second linear portion 38, and the tip end 28 are extended substantially in parallel.

The two arms 30 form the first slit 32$a$, the center hole 35$a$, and the second slit 38$a$ therebetween. Specifically, the first linear portions 32 form the first slit 32$a$ therebetween. The first bent portions 34, the center portions 35, and the second bent portions 36 form the center hole 35$a$ thereamong. The second linear portions 38 form the second slit 38$a$ therebetween. The first slit 32$a$, the center hole 35$a$, and the second slit 38$a$ are arranged in this order.

Each arm 30 is resiliently deformable (bendable) at its various connections. Specifically, each arm 30 is resiliently bendable at a connection between the root end 22 and the first linear portion, at a connection between the first linear portion and the first bent portion 34, and at a connection between the first bent portion 34 and the center portion 35. Each arm 30 is resiliently bendable further at a connection between the center portion 35 and the second bent portion 36, at a connection between the second bent portion 36 and the second linear portion, and at a connection between the second linear portion and the tip end 28.

The arms 30 and the connections among the arms 30, the root end 22, and the tip end 28 form a spring portion 24. The spring portion 24 is configured to be resiliently squished (squishable) inward toward the axis 20$a$ when being applied with an external force in the width direction. Specifically, the first linear portions 32 can be bent resiliently inward around the connections with the root end 22 to squish the first slit 32$a$. The first bent portions 34 can be bent resiliently inward around the connections with the first linear portions and around the connections with the center portions 35. The second bent portions 36 can be bent resiliently inward around the connections with the second linear portions 38 and around the connections with the center portions 35. Thus, the first bent portions 34 and the second bent portions 36 squish the aperture 30$a$ with the center portions 35. The second linear portions 38 can be bent resiliently inward around the connections with the tip end 28 to squish the second slit 38$a$. In this way, the spring portion 24 is resiliently deformable inward toward the axis 20$a$.

Figure 6:
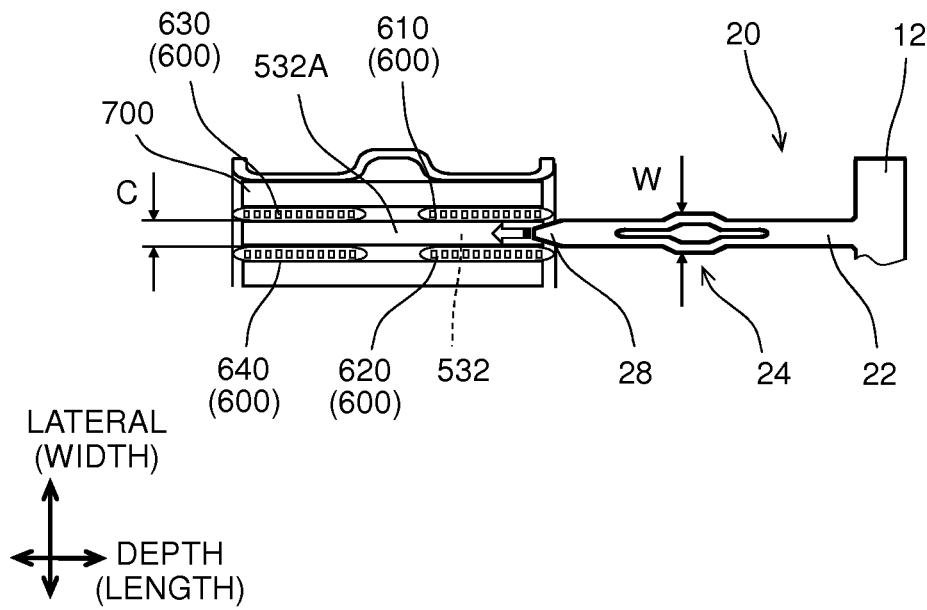
FIG. 6 is a sectional view showing one insert to be inserted in the evaporator.

As follows, a process to inert the blade 20 into the tubes 600 will be described. As shown in FIG. 6, the blade 20 is to be inserted among four tubes 600 including a first front tube 610, a second front tube 620, a first rear tube 630, and a second rear tube 640. The first front tube 610 and the second front tube 620 are located in parallel with each other in a fore row. The first rear tube 630 and the second rear tube 640 are located in parallel with each other in a rear row. The first rear tube 630 is located linearly behind the first front tube 610. The second rear tube 640 is located linearly behind the second front tube 620. The first front tube 610, the second front tube 620, the first rear tube 630, and the second rear tube 640 form an in-between clearance 532A, In the state of FIG. 6, the spring portion 24 has a width W in the width direction. The first front tube 610 and the second front tube 620 form the clearance 532 having a width C in the width direction. The width W is grater than the width C before the spring portion 24 is inserted between the first front tube 610 and the second front tube 620. In FIG. 6, the tip end 28 is inserted between the first front tube 610 and the second front tube 620 frictionally or loosely. As the blade 20 is further inserted, the spring portion 24 makes contact with the first front tube 610 and the second front tube 620.

Figure 7:
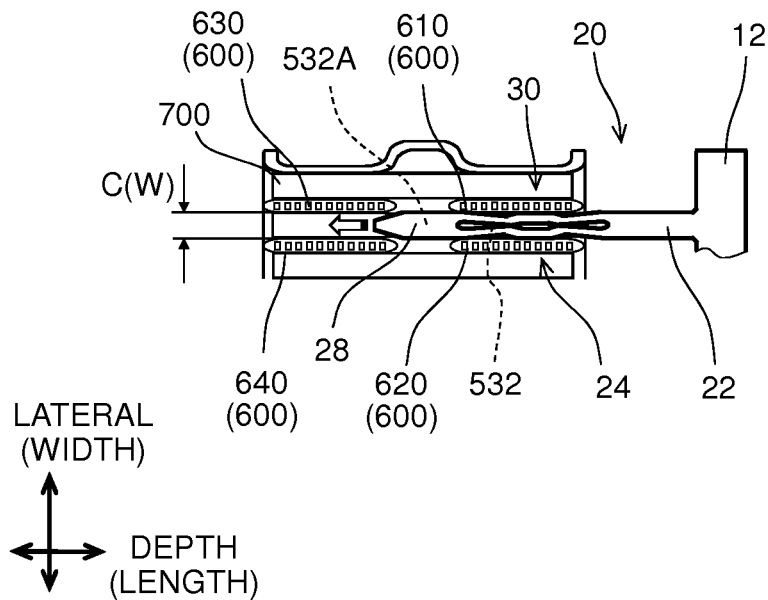
FIG. 7 is a sectional view showing one insert being inserted in the evaporator.

FIG. 7 shows a state in which the spring portion 24 is further inserted in the depth direction into the clearance 532 between the first front tube 610 and the second front tube 620. In FIG. 7, the tip end 28 is positioned in the in-between clearance 532$a$. In addition, the spring portion 24 is squished inward in the width direction and positioned between the first front tube 610 and the second front tube 620. The arms 30 are interposed between the first front tube 610 and the second front tube 620 and are resiliently bent inward in the width direction. The aperture 30$a$ is squished inward in the width direction to enable the spring portion 24 to be positioned between the first front tube 610 and the second front tube 620. In the state of FIG. 7, the width W of the spring portion 24 is reduced to be substantially equal to the width C of the clearance 532.

Figure 8:
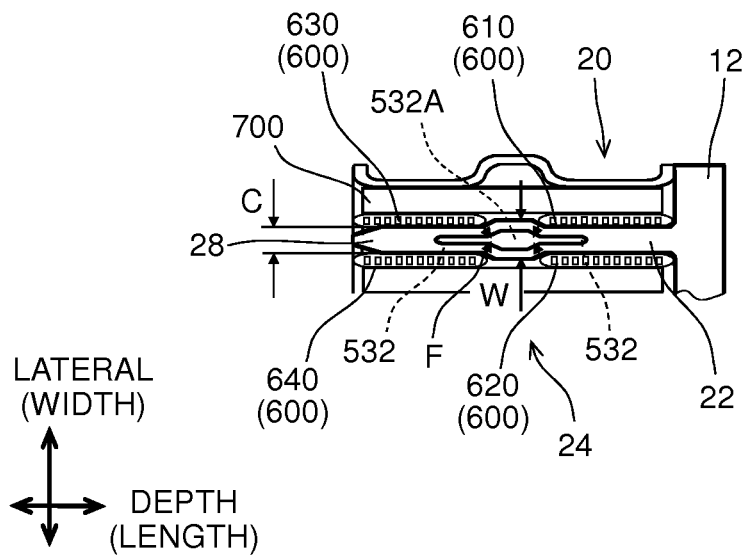
FIG. 8 is a sectional view showing one insert inserted in the evaporator.

FIG. 8 shows a state in which the spring portion 24 is further inserted in the depth direction through the clearance 532 between the first front tube 610 and the second front tube 620 into the clearance 532 between the first rear tube 630 and the second rear tube 640. In FIG. 8, the tip end 28 is inserted into the clearance 532 between the first rear tube 630 and the second rear tube 640. In addition, the spring portion 24 is positioned in the in-between clearance 532$a$. The root end 22 is positioned in the clearance 532 between the first front tube 610 and the second front tube 620. In the state of FIG. 8, the spring portion 24 is bent back into its original form before being squished. Therefore, the width W of the spring portion 24 is restored to be grater than the width C of the clearance 532 after the spring portion 24 is inserted into the in-between clearance 532A. Thus, the spring portion 24 maintains the position of the blade 20 in the depth direction and restricts the blade 20 from being pulled out of the evaporator 500. The inert 10 may be resiliently detachable from the evaporator 500 when, for example, the evaporator 500 is under a maintenance work.

In the state of FIG. 8, the spring portion 24 may be supported frictionally or loosely among the first front tube 610, the second front tube 620, the first rear tube 630, and the second rear tube 640. For example, the spring portion 24 may be resiliently in contact with all the first front tube 610, the second front tube 620, the first rear tube 630, and the second rear tube 640 in four directions. In this case, as shown by the four arrows, the spring portion 24 may be applied with resilient forces F from the contacts with the first front tube 610, the second front tube 620, the first rear tube 630, and the second rear tube 640. Alternatively, the spring portion 24 may be loosely supported by all or part of the first front tube 610, the second front tube 620, the first rear tube 630, and the second rear tube 640.

In addition, the tip end 28 may be supported frictionally or loosely between the first rear tube 630 and the second rear tube 640. The root end 22 may be supported frictionally or loosely between the first front tube 610 and the second front tube 620.

The base 12 may be in contact with the first front tube 610 and the second front tube 620 in the depth direction. The tip end 28 of the fore insert 10 may be in contact with the base 62 of the rear insert 60 (FIG. 4), which is inserted from the opposed side in the depth direction.

The blades 20 may be placed on upper end surfaces the fins 700 of the second section 540 and supported by the fins 700 when positioned in the state of FIG. 2.

(Modification of First Embodiment)

Figure 9A:
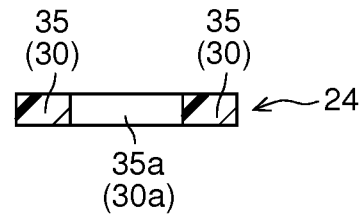
FIG. 9A is a sectional view showing a spring portion of the blade according to a first embodiment.

FIG. 9A is a sectional view taken along the line IXA-IXA in FIG. 5 and showing a cross section of the center portions 35 and the center hole 35a. In the first embodiment, the dimension of the aperture 30a is determined in consideration of, for example, the allowable communication (crosstalk) through the aperture 30a.

Figure 9B:
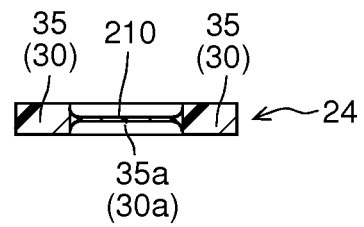
FIG. 9B is a sectional view showing a spring portion of a blade according to a first modification of the first embodiment.

FIG. 9B shows the spring portion 24 equipped with a film 210 according to a first modification. The film 210 is formed in the center hole 35a. In addition to the center hole 35a, the film 210 is also formed integrally in the first slit 32a and the second slit 38a (FIG. 5) to screen and/or block the first slit 32a, the center hole 35a, and the second slit 38a entirely. The film 210 is formed of an elastic material such as an ethylene propylene diene monomer rubber (EPDM rubber). The film 210 may be formed by insert molding or by dipping the spring portion 24 into a fluidic material of the film 210. In the example of FIG. 9B, the film 210 is formed to bridge the center portions 35 therebetween along the width direction. Specifically, the film 210 is formed between center positions of the center portions 35 in the thickness direction. The film 210 may be formed elastic enough to be squished and/or folded, when the spring portion 24 is squished and inserted between the tubes 600 (FIG. 7). The configuration of FIG. 9B may effectively restrict the crosstalk through the aperture 30a.

Figure 9C:
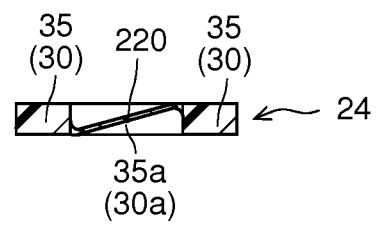
FIG. 9C is a sectional view showing a spring portion of a blade according to a second modification of the first embodiment.

FIG. 9C shows the spring portion 24 equipped with a film 220 according to a second modification. In addition to the center hole 35a, the film 220 is formed integrally in the first slit 32a and the second slit 38a (FIG. 5). The film 220 is formed of an elastic material such as an EPDM rubber. In the example of FIG. 9C, the film 220 is formed between a lower edge of the center portion 35 on the left side in FIG. 9C and an upper edge of the center portion 35 on the right side in FIG. 9C. That is, the film 220 is inclined relative to both the width direction and the thickness direction. The configuration of FIG. 9C may further facilitate the film 220 to be folded and/or squished when the spring portion 24 is squished and inserted between the tubes 600. The configuration of FIG. 9C may also effectively restrict the crosstalk through the aperture 30a.

Figure 9D:
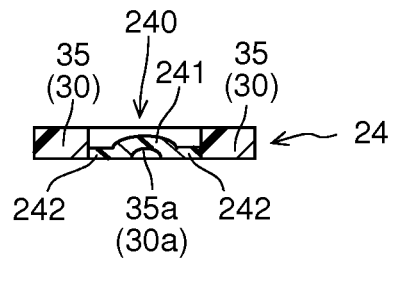
FIG. 9D is a sectional view showing a spring portion of a blade according to a third modification of the first embodiment.

FIG. 9D shows the spring portion 24 equipped with a film 240 according to a third modification. In addition to the center hole 35a, the film 240 is formed integrally in the first slit 32a and the second slit 38a (FIG. 5). The film 240 is formed of an elastic material such as an EPDM rubber. In the example of FIG. 9D, the film 240 includes a center film 241 and a peripheral film 242. The center film 241 is convex and is substantially in a dome shape. The center film 241 is projected upward in FIG. 9D to form a dimple on the lower side in FIG. 9D. The center film 241 is surrounded by the peripheral film 242. The peripheral film 242 is formed between a lower edge of the center portion 35 on the left side in FIG. 9D and a lower edge of the center portion 35 on the right side in FIG. 9D. The film 240 is substantially in a planar shape and extends along the width direction. The configuration of FIG. 9D may further facilitate the film 240 to be folded and/or squished at the upper end of the center film 241 in FIG. 9D and at the boundary between the center film 241 and the peripheral film 242, when the spring portion 24 is squished and inserted between the tubes 600. The configuration of FIG. 9D may also effectively restrict the crosstalk through the aperture 30a.

(Second Embodiment)

Figure 10:
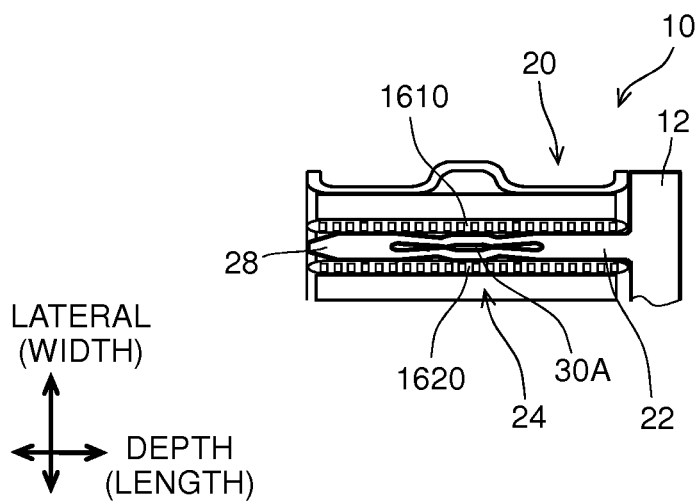
FIG. 10 is a sectional view showing one insert inserted in the evaporator according to a second embodiment.

As shown in FIG. 10, a second embodiment of the present disclosure employs a first tube 1610 and a second tube 1620, which are arranged in a single row. Dissimilarly to the first embodiment, each of tubes 1610 and 1620 is not separated in the direction of airflow and is integrated along the airflow. In the state of FIG. 10, the fore insert 10 is inserted between the adjacent tubes 1610 and 1620, and the spring portion 24 is squashed inward. Thus, the insert is resiliently and frictionally supported by the adjacent two tubes 1610 and 1620. In the configuration of FIG. 10, the aperture 30a is maintained as being squished. Thus, the configuration of the second embodiment may reduce crosstalk between through the aperture 30a.

(Third Embodiment)

Figure 11:
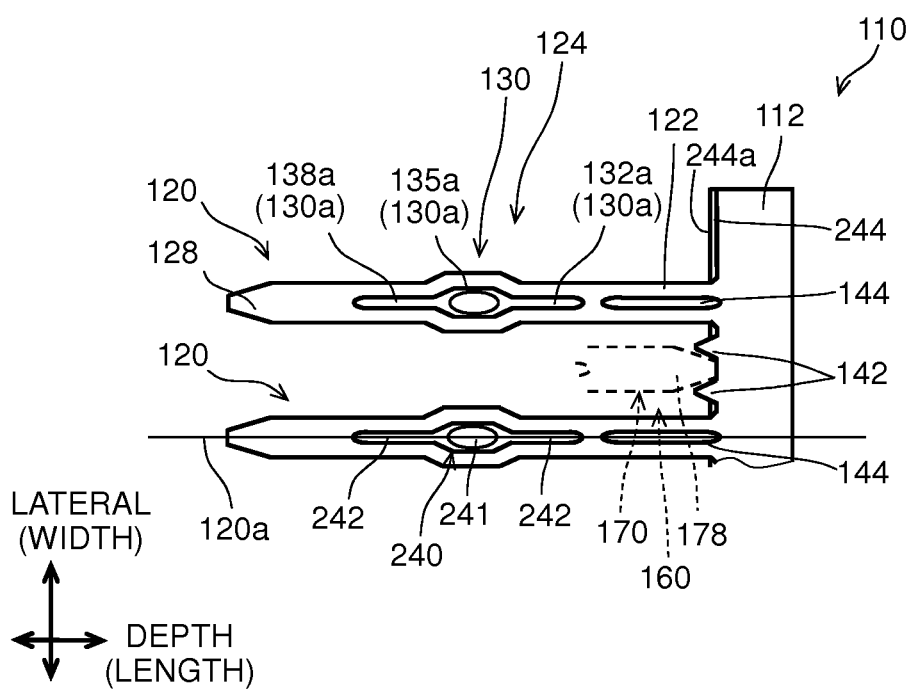
FIG. 11 is a top view showing inserts according to a third embodiment.
Figure 12:
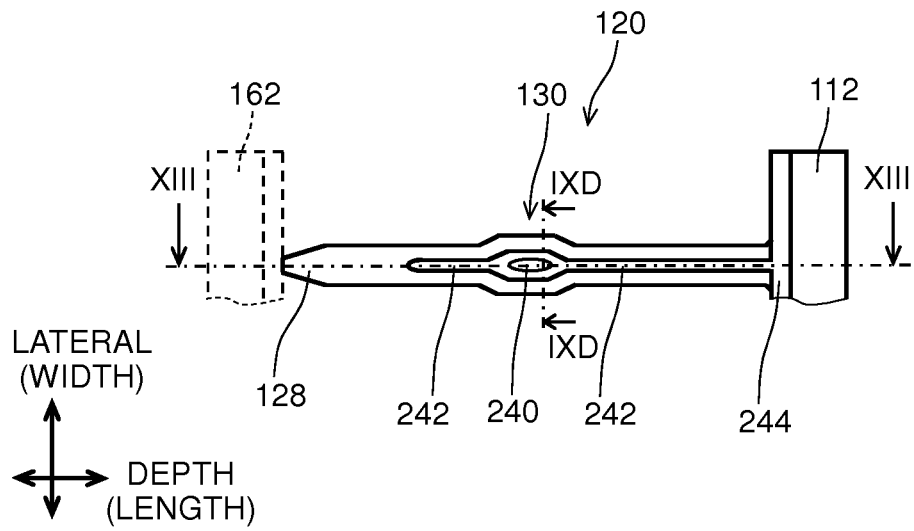
FIG. 12 is a rear view showing inserts according to the third embodiment.
Figure 13:
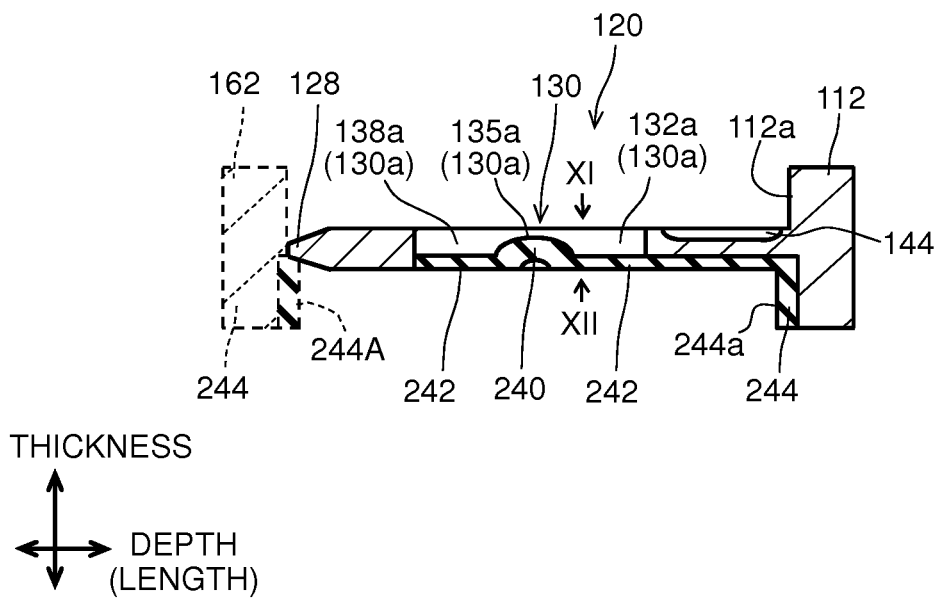
FIG. 13 is a sectional view showing inserts according to the third embodiment.

FIGS. 11 to 13 show a fore insert 110 according to the third embodiment. FIG. 11 is a top view when viewed along the arrow XI in FIG. 13. FIG. 12 is a rear view when viewed along the arrow XII in FIG. 13. FIG. 13 is a sectional view taken along the arrow XIII-XIII in FIG. 12. The insert 110 may be employable in the evaporator 500 as described in the first embodiment. In FIGS. 11 to 13, illustration of components of the evaporator, such as the tubes 600, the reinforcement 680, and the fins 700, are omitted.

FIG. 11 shows a state where the fore insert 110 is inserted from the one side in the depth direction, and a rear insert 160 is inserted from the other side in the depth direction. In FIG. 11, only the tip end 178 of the rear insert 160 is shown and remainder of the rear insert 160 is omitted. In FIG. 12, only a base 162 of the rear insert 160 is shown and remainder of the rear insert 160 is omitted.

Similarly to the first embodiment, the fore insert 110 and the rear insert 160 are each comb-shaped. The fore insert 110 and the rear insert 160 are opposed to each other in the depth direction. Blades 120 of the fore insert 110 and blades 170 of the rear insert 160 are arranged alternately and located substantially at the same level in the vertical direction. The configurations of the rear insert 160 may be substantially the same as the configurations of the fore insert 110.

In FIG. 11, the insert 110 includes the blades 120 and a base 112. The blades 120 are extended from the base 112 and are arranged in parallel along the width direction. The blade 120 includes a root end 122, two arms 130, and a tip end 128. The two arms 130 are arranged in parallel to form an aperture 130a therebetween. The aperture 130a is a single hollow space including a first slit 132a, a center hole 135a, and a second slit 138a. The arms 130 and the connections among the arms 130, the root end 122, and the tip end 128 form a spring portion 124. The spring portion 124 is configured to be resiliently squished (squishable) inward toward an axis 120a when being applied with an external force in the width direction.

The insert 110 employs the film 240 described above with reference to FIG. 9D. Specifically, the film 240 includes the center film 241 and the peripheral film 242. The center film 241 is substantially in an oval shape and located substantially at a center of the film 240 in both the width and length directions. The peripheral film 242 entirely screens the aperture 130a to close the first slit 132a, the center hole 135a, and the second slit 138a entirely.

The insert 110 has an elastic base 244 formed on the base 112. The elastic base 244 is formed of a same material, such as EPDM rubber, as that of the film 240 and is integrally formed with the film 240. Specifically, the elastic base 244 bridges the film 240 of each of the blades 120 into a singular form. The elastic base 244 has an elastic end 244a opposed to a tip end 178 of the blade 170. The film 240 and the elastic base 244 may be insert-molded on the insert 110. Alternatively, the film 240 and the elastic base 244 may be formed separately from the insert 110 and may be adhered onto the insert 110.

As shown in FIG. 13, the base 112 has a rigid end 112a, and the elastic base 244 has the elastic end 244a. The elastic end 244a is projected in the length direction leftward in FIG. 13 relative to the rigid end 112a. That is, the elastic end 244a is raised stepwise relative to the rigid end 112a. Therefore, when the insert 110 is inserted into the evaporator 500, the elastic end 244a first makes contact with lateral surfaces of the tubes 600 and the fins 700. When the insert 110 is further inserted into the evaporator 500, the elastic end 244a may elastically deform to fill a gap between the elastic end 244a and the lateral surfaces of the tubes 600 and the fins 700. In addition, the elastic deformation of the elastic end 244a may facilitate alignment of the insert 110 relative to the evaporator 500. The elastic end 244a may be configured elastically to receive the tip end 128 of the blade 120 and to reduce a gap between the tip end 128 and the base 162.

The base 112 has two protrusions 142 between the blades 120, which are adjacent to each other. The two protrusions 142 are projected from the base 112 in the length direction. The two protrusions 142 are configured to receive the tip end 178 of the blade 170 and to fill a gap between the tip end 178, the base 112, and the tube 600 (FIG. 8). The root end 122 (FIG. 11) forms a recess 144 dented in the thickness direction (FIG. 13).

(Fourth Embodiment)

Figure 14:
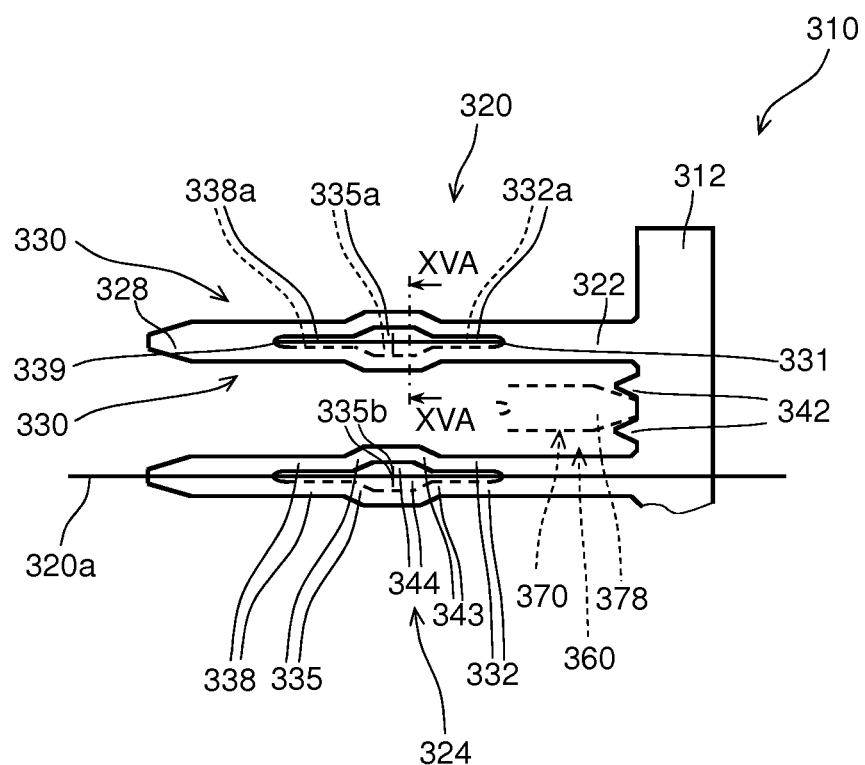
FIG. 14 is a top view showing inserts according to a fourth embodiment.
Figure 15A:
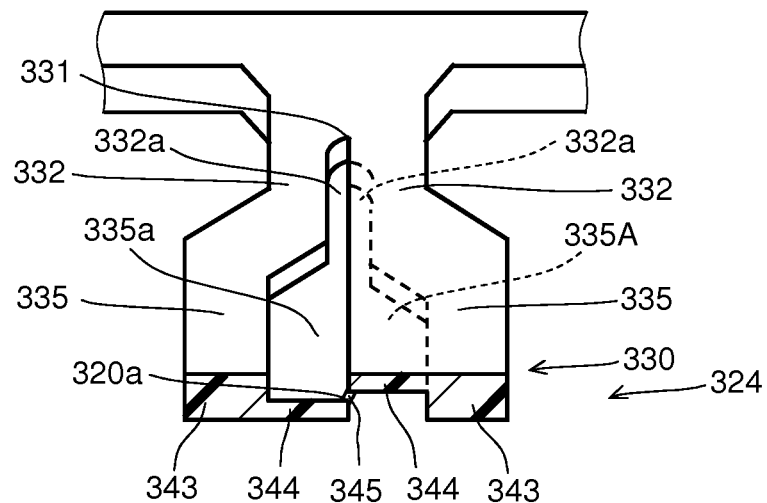
FIG. 15A is a perspective sectional view showing a blade of one insert according to the fourth embodiment.
Figure 15B:
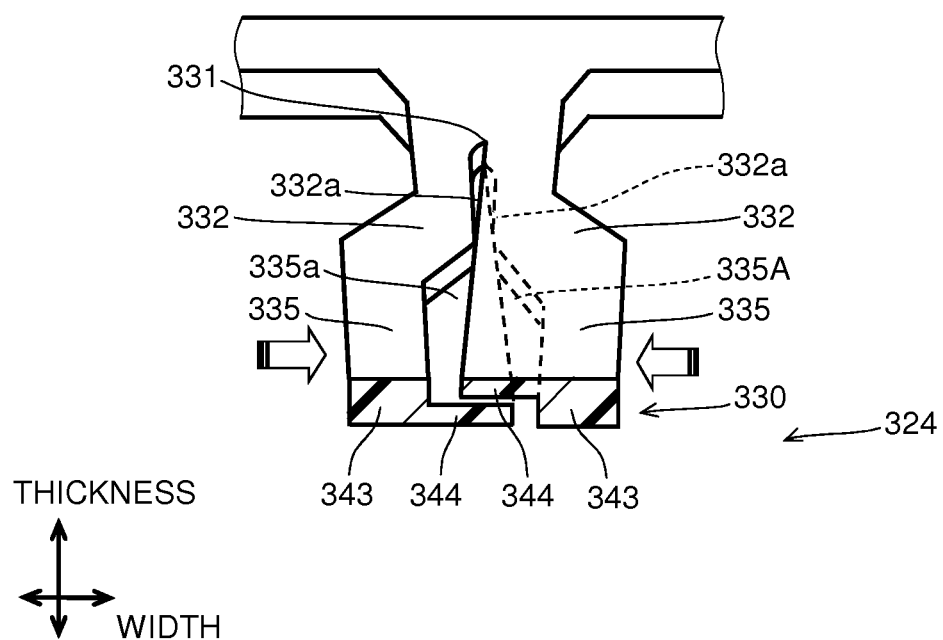
FIG. 15B is a perspective sectional view showing the blade of FIG. 15A on application of an external force.

FIGS. 14 to 15B show blades 320 of a fore insert 310 according to the fourth embodiment. FIG. 15A is a perspective sectional view taken along the arrow XVA-XVA in FIG. 14. The insert 310 may be employable in the evaporator 500 as described in the first embodiment.

Similarly to the first embodiment, the fore insert 310 and a rear insert 360 are each comb-shaped. The fore insert 310 and the rear insert 360 are opposed to each other in the depth direction, such that the blades 320 of the fore insert 310 and blades 370 of the rear insert 360 are arranged alternately. The configurations of the rear insert 360 may be substantially the same as the configurations of the fore insert 310. The insert 310 includes the blades 320 and a base 312. The blades 320 are extended from the base 312 and are arranged in parallel along the width direction. Similarly to the third embodiment, the base 312 has two protrusions 342 between the blades 320, which are adjacent to each other. The two protrusions 342 are projected from the base 312 in the length direction.

The blade 320 includes a root end 322, two arms 330, and a tip end 328. The arm 330 includes a first linear portion 332, a center portion 335, and a second linear portion 338, which are arranged in this order. The arm 330 has a first recess 332a, a center recess 335a, and a second recess 338a. The arm 330 further has a thick portion 343 and a thin portion 344.

As shown in FIG. 15A, cross sections of the arms 330 are point-symmetric about an axis 320a of the blade 320. The axis 320a passes along the axial direction through the center point of the cross section of the blade 320. One of the arms 330 on the left side in FIG. 15A has the first recess 332a and the center recess 335a, which are dented downward in FIG. 15A, and the second recess 338a (not illustrated in FIG. 15A) is also dented downward similarly. The other of the arms 330 on the right side in FIG. 15A has the first recess 332a and the center recess 335a, which are dented upward in FIG. 15A, and the second recess 338a (not illustrated in FIG. 15A) is also dented upward similarly.

The thin portion 344 is substantially in a thin plate shape and defines a bottom surface of the first recess 332a, the center recess 335a, and the second recess 338a. The thick portion 343 is a remainder of the arm 330 excluding the thin portion 344.

The blade 320 may be formed of resin by injection molding. Specifically, molding dies (not shown) are mated from the upper side and the lower side in FIG. 15A to form a molding cavity, and resin is injected into the molding cavity to mold the blade 320. When molding, the upper and lower dies may form a small gap to form a flash 345 to bridge edges of the thin portions 344 therebetween. The flash 345 extends along the boundary between the thin portions 344 in the direction of the axis 320a.

In FIG. 14A, the arms 330 are resiliently deformable (bendable) at, for example, pivots 331 and 339. The arms 330 and the pivots 331 and 339 may form a spring portion 324. The spring portion 324 is configured to be resiliently squished (squishable) inward toward the axis 320a when being applied with an external force in the width direction.

As shown in FIG. 15B, when an external force is applied to the center portion 335 in the width direction along the arrows, the flash 345 is crushed to enable the thin portions 344 to move inward in the width direction around the pivot 331. The thin portions 344 are movable within the clearance formed by the recesses 332a, 335a, 338a, while overlapping one another in the thickness direction. When the external force is released, the thin portions 344 resiliently recover in shape to be in the state of FIG. 15A. Thus, the spring portion 324 according to the present embodiment enables the blades 320 to be inserted between the tubes 600 of the evaporator 500, similarly to the first embodiment, as described above with reference to FIGS. 6 to 8.

In FIG. 14, the center portion 335 may have a thin notch 335b to extend through the thin portion 344 in the thickness direction. In the present configuration, when an external force is applied to the center portion 335 in the width direction, the thin portion 344 is sheared at the thin notch 335b to form a crevasse (crack) inside the center portion 335. With the thin notch 335b, the thin portion 344 less impedes the center portion 335 from bending, by sharing itself, thereby to facilitate the resilient deformation of the center portion 335. The thin notch 335b may be formed by an additional thin blade portion to the molding dies. The thin notch 335b may be in a narrow slit, a V-shaped slit, and/or a U-shaped slit. The thin notch 335b may be a thin flash, which can be easily crushed and sheared when the center portion 335 is bent.

The flash 345 may not be formed. In this case, the thin portions 344 may form a thin slit therebetween along the axis 320a.

The insert 320 according to the fourth embodiment may reduce leakage of airflow therethrough, without an additional film to screen an aperture.

The insert 320 of the fourth embodiment may be additionally formed with the elastic base 244 of the third embodiment. The insert 320 of the fourth embodiment may be additionally formed with the recess 144 of the third embodiment.

(Fifth Embodiment)

Figure 16:
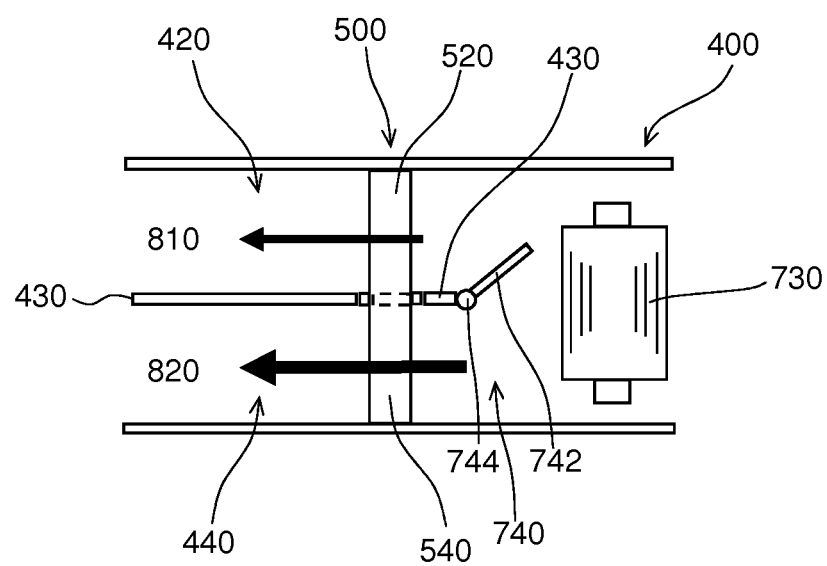
FIG. 16 is a schematic view showing the evaporator in an HVAC case according to a fifth embodiment.
Figure 16:
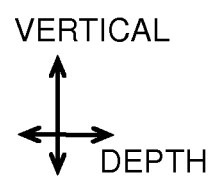

FIG. 16 shows an HVAC system according to the fifth embodiment. The present embodiment employs a singular fan 730 to cause airflows in both the upper passage 420 and the lower passage 440. The present embodiment employs a valve 740 equipped between the fan 730 and the partition 430 and located on the upstream side of the evaporator 500. The valve 740 is, for example, a butterfly valve including a planar body 742 and a rotational shaft 744 to form a cantilever structure. The body 742 is rotatable around the rotational shaft 744 to control distribution of airflow between the upper passage 420 and the lower passage 440. In the example of FIG. 16, the valve 740 is directed upward in FIG. 16 to cause airflow in the lower passage 440 greater than airflow in the upper passage 420. The above-described evaporator 500 having the insert may be also effectively applicable also to the HVAC shown in FIG. 16.

(Other Embodiment)

The fins 700 and the tubes 600 may be, for example, stacked and brazed first to form the core of the evaporator 500. Subsequently, the clearance 532 may be formed by thrusting a blade-shaped core into the fins 700 thereby to pre-punch the fins 700 at a position corresponding to the intermediate section 530 to enable insertions of the insert. Alternatively or in addition, the blades of the insert may be inserted into clearances, which are originally formed between the wave-shaped fins 700 and the tubes 600. Alternatively or in addition, each fin 700 of the first section 520 may be arranged to extend downward from its upper end to the intermediate section 530, and each fin 700 of the second section 540 may be arranged to extend from its lower end upward to the intermediate section 530. In this way, the clearance 532 may be formed between the first section 520 and the second section 540, without punching the fins 700.

The number of the blades 20 may be two or more to form the comb shape of the insert. The spring portion 24 may be formed in at least one of the blades. For example, the spring portion 24 may be formed in three blades including one blade located at the center of the insert and two blades located at both ends of the insert.

The fore insert 10 and the rear insert 60 may be integrated into a single piece having all the blades 20 enough to partition the first section 520 from the second section 540. In this case, the insert may be inserted to the intermediate section 530 from only one direction. The insert may be formed of a metallic material, such as aluminum alloy, by casting or stamping.

The fins 700 may be continual between the first section 520 and the second section 540. In this case, the blades 20 may be inserted into air passages formed between the fins 700 and the tubes 600. In this case, the air passages, into which the blades 20 are inserted, may function as clearances 532.

The configurations of the present disclosure are not limited to be employed in an evaporator 500 and may be employed in various heat exchangers such as a condenser and/or radiator. The configuration of the present disclosure may be employed in a heat exchanger for an exterior and interior two-layer air conditioning system. In this case, the heat exchanger may be partitioned for separating exterior air passage and an interior air passage.

For purposes of clarity, the same reference numbers will be used in the drawings to identify similar elements. As used herein, the phrase at least one of A, B, and C should be construed to mean a logical (A or B or C), using a non-exclusive logical or.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An insert for a heat exchanger having a plurality of tubes, the insert comprising:
    a base; and
    a plurality of blades extending from the base, wherein
    at least one of the blades has a spring portion, which is resiliently deformable,
    the spring portion includes two arms each of which protrudes away from each other to form an aperture therebetween,
    the tubes include a first front tube, a second front tube, a first rear tube, and a second rear tube,
    the first front tube and the second front tube define a first space therebetween,
    the first front tube, the second front tube, the first rear tube, and the second rear tube define a second space therebetween,
    the two arms define an original form with a width that is greater than the first space,
    the two arms are configured to (i) allow the spring portion to be inserted into the first space by resiliently being bent inward and (ii) engage with the first front tube, the second front tube, the first rear tube, and the second rear tube in the second space by resiliently being bent back into the original form, wherein the insert further includes a film formed of an elastic material in the aperture, the film screens the aperture, and the film is configured to be resiliently deformed when the spring portion is inserted into the first space.

2. The insert according to claim 1, wherein the base and the blades are integrally formed in a comb shape, and the blades extend from the base perpendicularly to the base.

3. The insert according to claim 1, wherein the two arms include C-shaped portions, respectively, and the C-shaped portions project outward.

4. The insert according to claim 3, wherein the two arms are symmetrical with respect to an axis of the at least one of the blades.

5. The insert according to claim 3, wherein the at least one of the blades further includes a tip end and a root end, the root end extends from the base, the C-shaped portions extend from the root end, and the tip end extends from the spring portion.

6. The insert according to claim 5, wherein the C-shaped portions project outward relative to the root end and the tip end.

7. The insert according to claim 6, wherein the aperture further includes a first slit, the arms further include first linear portions, respectively, the first linear portions are located between the root end and the C-shaped portions, and the first linear portions form the first slit therebetween.

8. The insert according to claim 7, wherein the aperture further includes a second slit, the arms further include second linear portions, respectively, the second linear portions are located between the C-shaped portions and the tip end, and the second linear portions form the second slit therebetween.

9. The insert according to claim 8, wherein the aperture further includes a center hole, the C-shaped portions form the center hole therebetween, and the first slit, the center hole, and the second slit are arranged in this order to form a single hollow space.

10. The insert according to claim 9, wherein each of the C-shaped portions includes a first bent portion, a center portion, and a second bent portion, which are connected in this order, and the center portion is located outside the first linear portion and the second linear portion.

11. The insert according to claim 1, wherein the film includes a center film in a dome shape.

12. The insert according to claim 1, wherein the base has an elastic base configured to be elastically in contact with the tubes.

13. The insert according to claim 1, wherein the base has a plurality of protrusions projected from the base and located between two of the blades, which are adjacent to each other.

14. An insert for a heat exchanger having a plurality of tubes, the insert comprising:

a base; and a plurality of blades extending from the base, wherein at least one of the blades has a spring portion that is resiliently deformable, the spring portion includes two arms each of which protrudes away from each other to form an aperture therebetween, the tubes include a first front tube, a second front tube, a first rear tube, and a second rear tube, the first front tube and the second front tube define a first space therebetween, the first front tube, the second front tube, the first rear tube, and the second rear tube define a second space therebetween, the two arms define an original form with a width that is greater than the first space, the two arms are configured to (i) allow the spring portion to be inserted into the first space by resiliently being bent inward and (ii) engage with the first front tube, the second front tube, the first rear tube, and the second rear tube in the second space by resiliently being bent back into the original form, wherein the insert further includes:

an elastic base formed of an elastic material on the base and configured to be elastically in contact with the tubes; and at least two films each formed of the elastic material to extend from the base and to screen the aperture and configured to be resiliently deformed when the spring portion is deformed inward, wherein the elastic base bridges the at least two films.

* * * * *